US008129667B2

(12) United States Patent
Moore et al.

(10) Patent No.: US 8,129,667 B2
(45) Date of Patent: Mar. 6, 2012

(54) SUN-TRACKING CONTROLLER FOR MULTIPLE SOLAR COLLECTORS

(75) Inventors: Coleman Moore, Westminster, CO (US); Randy Gee, Arvada, CO (US)

(73) Assignee: SkyFuel, Inc., Arvada, CO (US)

( * ) Notice: Subject to any disclaimer, the term of this patent is extended or adjusted under 35 U.S.C. 154(b) by 464 days.

(21) Appl. No.: 12/353,194

(22) Filed: Jan. 13, 2009

(65) Prior Publication Data
US 2009/0205637 A1 Aug. 20, 2009

Related U.S. Application Data

(60) Provisional application No. 61/029,466, filed on Feb. 18, 2008.

(51) Int. Cl.
*F24J 2/38* (2006.01)
(52) U.S. Cl. ..................... 250/203.4; 126/601
(58) Field of Classification Search ............... 250/203.4; 126/600–606
See application file for complete search history.

(56) References Cited

U.S. PATENT DOCUMENTS

| 4,031,444 | A | 6/1977 | Beck, Jr. |
| 4,031,879 | A | 6/1977 | Parham |
| 4,146,785 | A | 3/1979 | Neale |
| 4,158,356 | A | 6/1979 | Wininger |
| 4,178,913 | A | 12/1979 | Hutchison |
| 4,195,620 | A | 4/1980 | Rust |
| 4,211,922 | A | 7/1980 | Vaerewyck et al. |
| 4,368,962 | A | 1/1983 | Hultberg |
| 4,440,150 | A | 4/1984 | Kaehler |
| 4,536,847 | A | 8/1985 | Erickson et al. |
| 5,347,986 | A | 9/1994 | Cordy |
| 5,929,530 | A | 7/1999 | Stone |
| 6,123,067 | A | 9/2000 | Warrick |
| 6,680,693 | B2 * | 1/2004 | Urban et al. ............. 342/357.64 |
| 7,055,519 | B2 | 6/2006 | Litwin et al. |
| 7,055,591 | B2 | 6/2006 | Kang et al. |
| 7,281,381 | B2 | 10/2007 | Johnson |
| 2006/0225729 | A1 | 10/2006 | Litwin |
| 2009/0188488 | A1 * | 7/2009 | Kraft et al. .................... 126/601 |

OTHER PUBLICATIONS

International Search Report dated Feb. 20, 2009 for International Application No. PCT/US09/30872.

* cited by examiner

*Primary Examiner* — Seung C Sohn
(74) *Attorney, Agent, or Firm* — Greenlee Sullivan P.C.

(57) ABSTRACT

A solar collector tracking system is provided for maintaining orientation of multiple solar collectors to the sun to provide optimal focusing of solar radiation on a receiver. The system includes a local controller circuit board that contains a sun-tracking algorithm to control the movement of multiple solar collectors to keep them optimally focused on the sun. The system also comprises a separate motor controller for each collector in data line connection with the local controller, and a motor for each collector in power connection with its motor controller. This isolates the local controller from the motor and protects the circuit board against power surges. The local controller allows effective field maintenance using field-replaceable components. Its circuit board is preassembled in a rugged, weather-proof cabinet to minimize the time and work required to prepare and install it in the field. The typical service life of this durable local controller is expected to be 30 years.

18 Claims, 8 Drawing Sheets

A

B

SUN-TRACKING CONTROLLER FOR MULTIPLE SOLAR COLLECTORS

CROSS-REFERENCE TO RELATED APPLICATIONS

This application claims priority to U.S. Provisional Patent Application No. 61/029,466, filed Feb. 18, 2008, which is incorporated herein by reference to the extent not inconsistent herewith.

BACKGROUND

Systems for tracking the sun and keeping solar collectors oriented to the sun throughout the day have been proposed and used for many years. A number of U.S. patents discuss this concept, including U.S. Pat. Nos. 7,055,591, 7,281,381, 4,158,356, 4,146,785, 6,123,067, 4,031,444, 4,368,962, 4,178,913, 5,347,986, and 5,929,530, and U.S. Patent Publication No. 2006/0225729. Several of these patents have proposed controlling the movement of multiple solar collectors from a single controller. See, e.g., U.S. Pat. Nos. 4,031,444, 4,158,356, 4,146,785, 4,368,962, 6,123,067, and 7,055,519, and Patent Publication No. 2006/0225729. Of these, only U.S. Pat. No. 4,031,444 discloses the possibility of providing radio frequency control of the orientation of multiple solar collectors. It proposes controlling many solar fields over a geographic area of several hundred square miles from a single central controller located, e.g., atop Mt. Wilson. The patent speculates that a network of slave stations driven from one central station in the United States which is capable of calculating and transmitting time and motion corrections for each specific geographic area could be used. However, this patent does not disclose or suggest that each separate solar collector could be separately controlled, nor does it suggest a central control system capable of receiving feedback from individual solar collectors concerning a number of process conditions and transmitting individualized commands and corrections to each separate collector.

Commercial solar fields exist in which each solar collector is controlled via a separate local controller that can be at least partially controlled via a centrally-located master controller; however, these systems do not have local controllers that send data signals to motor controllers, nor do these local controllers perform calculations, or allow full feedback, control and updating of local controller and motor settings. They require separate cables between the master controller and local controller of each of the many hundreds of solar collectors in the field, which can become extremely expensive. Wireless control of the orientation of multiple solar collectors appears to have remained conceptual and has not been commercially implemented.

Programmable motor controllers are known to the art, e.g., Automation Direct Model No. GS2-11P0, described in the published specifications for this model available on the Automation Direct website.

The foregoing examples of related art and limitations in the teachings of such art are intended to be illustrative and not exclusive. Other limitations of the related art will become apparent to those of skill in the art upon a reading of the specification and a study of the drawings.

All patents and publications referred to herein are incorporated by reference in their entireties, to the extent not inconsistent herewith, for purposes of enablement and written description.

SUMMARY

Provided herein is a solar collector tracking system for maintaining orientation of multiple solar collectors to the sun to provide optimal focusing of solar radiation on a receiver. Solar tracking algorithms are known to the art for calculating the position of the sun at a given time and place, and for commanding movement of solar collectors to track the sun so that maximum or optimal solar radiation is reflected and focused on a receiver.

The solar collector tracking system comprises a local controller circuit board that advantageously comprises a sun-tracking algorithm to control the movement of multiple solar collectors to keep them optimally focused on the sun. Alternatively or additionally, the local controller can receive signals from a remote master controller that it uses to control the movement of the solar collectors under its control. The system also comprises a separate motor controller for each collector in data line connection with the local controller, and a motor for each collector in power connection with its motor controller. This arrangement isolates the local controller from the motor and protects the circuit board against power surges, a level of protection not found in previous systems. The term "data line" as used herein refers to a line that carries data but not power when the system is in operation.

The local controller is designed to allow effective field maintenance using field-replaceable components. The local controller circuit board is preassembled in a rugged, weather-proof cabinet to minimize the time and work required to prepare and install it in the field. The typical service life of this durable local controller is expected to be 30 years. The operations of the local controller and the status of collector position and absorber temperature can be monitored by the local controller and remotely at a master controller so that local controller, sensor and motor problems can be quickly identified and take care of. The local controllers, motor controllers they control, and motors are designed to be field-replaceable to minimize down time.

In an embodiment, the microprocessor contained within the local controller can comprise software capable of providing signals to the motor controller to start and/or stop movement of the motor and/or change motor speed and direction in response to status signals received by the microprocessor. The motor controller has a single-phase 110 V AC power input, which is converted in the motor controller to a three-phase variable-frequency 220 V AC power output leaving the motor controller, as known to the art. This embodiment cuts the power requirements for moving the collector by about half, and reduces wear and tear on motor controller and motor components.

In addition to the exemplary aspects and embodiments described above, further aspects and embodiments will become apparent by reference to the drawings and by study of the following descriptions.

BRIEF DESCRIPTION OF THE DETAILED DRAWINGS

Figure 1:
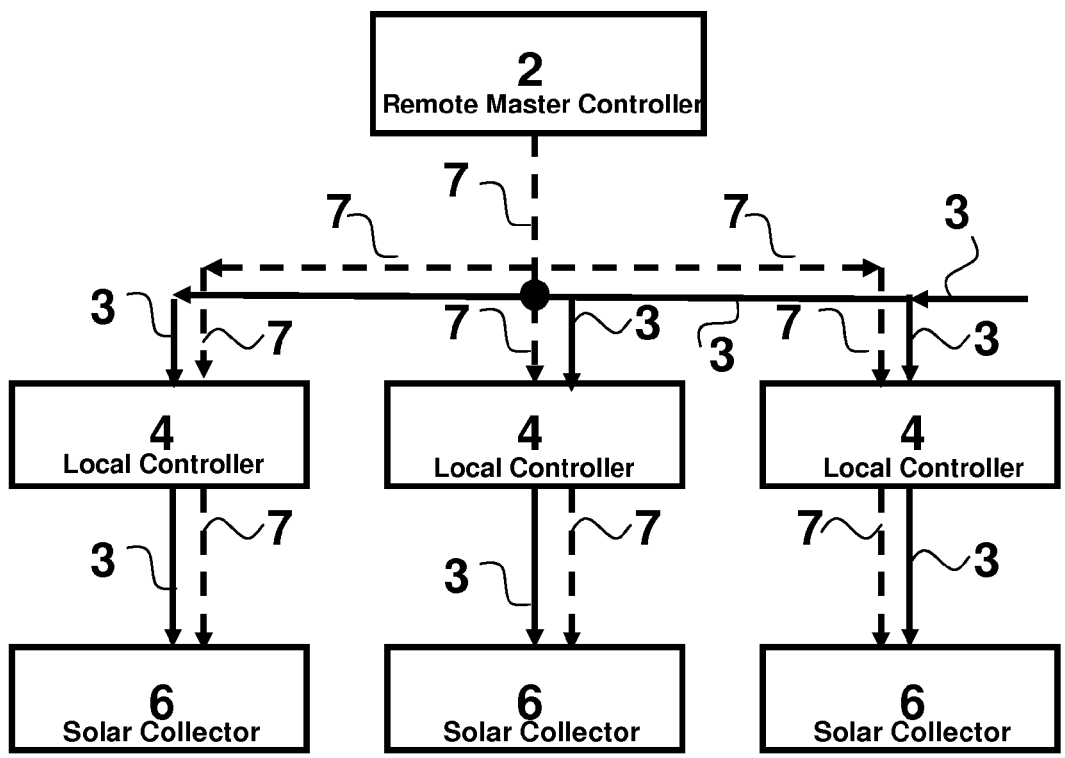
FIG. 1 is a schematic drawing showing the configuration of prior art sun-tracking control systems.

Exemplary embodiments are illustrated in referenced figures of the drawings. It is intended that the embodiments and figures disclosed herein are to be considered illustrative rather than limiting.

DESCRIPTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Provided herein is a solar collector tracking system for maintaining orientation of multiple solar collectors to the sun to provide optimal focusing of solar radiation on a receiver. The solar collector tracking system comprises a local controller circuit board that controls movement of multiple solar collectors. The term "multiple" as used herein with respect to solar collectors and their associated components means two or more. In embodiments, it can mean three or more, four or more, five or more, or any number of such collectors or components from two to 250. Typically it means three.

Solar collectors used in this system can be any type of solar collector, including photovoltaic (PV) collectors, as well as thermal collectors such as parabolic trough collectors, dish collectors, flat collectors, power tower systems, Fresnel systems, and other such collectors known to the art. These systems work by concentrating solar radiation on a receiver for heating an absorber, such as a heat transfer fluid in the case of thermal systems, or a PV cell in the case of PV systems. In thermal systems, the heat transfer fluid can be inside the receiver, as is typically the case with parabolic trough collectors, or can be closely associated with the receiver, as is the case with power tower systems. A "solar collector" as used herein includes a solar reflector and can also include an associated receiver, if the receiver is attached to the reflector and moves as a unit with the collector.

Heat transfer fluids are known to the art and include water, air, synthetic oil, molten salt and pressurized steam.

"Optimal" focusing of solar radiation means that the amount of sunlight that is focused on the receiver is the greatest amount that can be focused on the receiver and that the system can handle at any particular time and under any particular conditions. Typically the solar collectors will be part of a solar field of a power plant, and will provide heat energy to a steam generator for generation of electric power. Since the movement of the sun across the sky is continuous throughout the day, it is necessary to frequently orient the position of the collector in order to achieve the desired high level of focusing of the solar collector. In addition, at some times weather conditions can exist that would damage the collectors if they were oriented toward the sun, and it can be necessary to place the collectors in "stow" position, to provide minimal wind resistance or reduce accumulation of water or snow. Also, if the absorber that is heated by solar radiation from a reflector becomes too hot, e.g., above about 750° F., such that it can damage the receiver and/or absorber, at such times, "optimal" focusing of solar radiation will mean focusing less than all (or none) of the solar radiation on the receiver. Typically the collector is moved about 10 degrees away from the position in which it focuses maximum solar energy onto the receiver, which de-focuses the solar radiation and prevents overheating of the receiver. The heat transfer fluid can also be too cold to flow freely, e.g., less than about 60° F. or 70° F. In this case "optimal focusing of solar radiation" can mean providing no solar radiation until the fluid warms up, thus placing the collector in "stow" position. Further, to truly focus maximum solar radiation on the receiver at every moment requires that the motors that change the position of the collectors constantly be running, which leads to excess power consumption by the motors, and wear them out sooner than otherwise. Thus, sun-tracking systems usually activate the motors intermittently as the sun moves across the sky. "Optimal" focusing of solar radiation thus depends on balancing periods of motor activation with periods when the motors are inactive to achieve maximum solar reflection that does not unduly damage the motors or consume undue amounts of power. "Optimal" focusing of solar radiation is readily determined by those of skill in the art without undue experimentation.

A "solar collector array" as used herein means a collection of solar collectors (also called solar collector assemblies) arrayed on a solar field.

A "solar field" as used herein refers to all the solar collectors at a single contiguous location.

The tracking system described herein comprises multiple solar collectors, each having an associated motor operationally connected thereto for changing the position of each collector with respect to the sun.

"Changing the position of a solar collector" means to adjust its angle with respect to the sun. It can include rotating the collector through an arc around a single axis, as with parabolic trough collectors, rotating the position of the collector through two or more arcs around two or more axes, or can include moving the collector laterally.

Motors for moving solar collectors are known to the art. Operational connection between the motors and the collector means that the motors and collectors are mechanically linked so that movement of the motor moves the collector. For example, movement of the motor in a forward or backward direction moves the collector in a forward or backward direction, the forward direction typically being a westward direction and the backward direction typically being an eastward direction.

The tracking system also comprises a position indicator, also referred to herein as position-sensing means, operably connected to each solar collector for detecting and signaling the position of a solar collector with respect to the sun. The position signal sent by the position indicator can be detected by the local controller, the master controller, or both. Such position-sensing means can include an inclinometer or other instrument, such as an optical encoder known to the art that is operationally connected to the collector such that it can generate a wireless or electronic position status signal representing the position of the collector.

The tracking system also comprises a local controller in operational connection with multiple solar collectors. The local controller can comprise position-receiving means for receiving the position status signals from the position indictors associated with the collectors under its control. It can also comprise means for comparing the position of each of the multiple collectors under its control with respect to the sun with an optimal position for each collector and calculating and transmitting motor-control signals via a data connection such as a serial cable or wireless connection to control movement of the multiple solar collectors to an optimal position with respect to the sun. Such position-receiving means and comparison and calculation algorithms are known to the art, as are motor-control signals, and data connections for carrying them.

The local controller also comprises means for sending additional motor-control signals at selected times to move the collectors selected distances to maintain an optimal position of said collectors with respect to the sun. As discussed above, the local controller can comprise comparing and calculating means, such that it performs the tracking calculations itself, rather than the tracking calculations being performed by a master controller. Whether the calculations are done in the local controller or outside of the local controller and the results then transmitted to the local controller, the local controller sends a data signal to the motor controllers for controlling the motors to move the collectors. Sun-tracking algorithms are known to the art, as are means for generating and sending data signals based thereon. The "selected times" are typically periodic intervals, such as an interval during which the sun moves westward about 0.10 to about 0.14 degrees. The selected distances are typically an arc of about 0.1 to about 0.5 degrees, and advantageously, an arc of about 0.10 to about 0.14 degrees. The algorithm typically calculates motor movements that keep the collector focused to within about 0.05 to about 0.15 degrees, and advantageously from about 0.05 to about 0.125 degrees, or from about 0.05 to about 0.07 degrees of the sun's 360-degree movement around the earth. These times and distances are readily ascertained by one skilled in the art without undue experimentation by balancing desired accuracy of reflection against the harmful effects of frequent activation of the motors. The time between motor movements defines a "dead band" with the point of maximum reflectivity in the middle. During the period of the "dead band," during which the collector does not move, the sun moves from a position at which the reflector reflects less than maximum sunlight through the midpoint at which the reflector reflects the maximum sunlight, to a point where the reflector again reflects less than maximum sunlight.

The tracking system also comprises multiple motor controllers, in signal communication with said local controller through data lines, said motor controllers comprising means for receiving motor-control signals from said local controller and transmitting corresponding electrical control currents via power connections to said motors for controlling operation of said motors; said motor controller also comprising means for transmitting motor status signals to said local controller via said data lines. Each collector has an associated motor and motor controller. The local controller can signal each motor controller separately with different commands for different motor movements, or all motor controllers that are controlled by the local controller can receive the same signal from the local controller. The data line can be any line known to the art that is capable of carrying data, such as a serial cable, an optical cable, or an electrical cable. Means for receiving motor-control signals carried by such data lines and converting them to electrical current signals are known to the art.

The tracking system advantageously further comprises a master controller, also known as a field control server, in data signal communication, which can be wired or wireless, with said local controller. The master controller comprises means for receiving position status signals from the local controller for each solar collector; and means for transmitting position control signals from to the local controller for each solar collector. Such receiving and transmitting means are known to the art. The master controller is capable of sending an overriding command signal for a change of collector position that takes precedence over any motor-control signal originating in the local controller.

The master controller is typically a central controller for the entire solar field, or portion thereof. It can be located a distance of a mile or more from some of the local controllers that are under its control. It receives data from the local controllers regarding the current operating configurations, positions of the collectors and temperatures of the absorbers, e.g., heat transfer fluid, of the receivers. The master controller can respond to data regarding heat transfer fluid temperatures by turning the pumps for the heat transfer fluid on or off or controlling the speed of the pumps. It can detect and display information regarding non-response of a collector to a motor-control signal or a manual override of collector position within milliseconds, enabling an operator to take quick action to repair or inactivate a collector that is malfunctioning or being interfered with. The master controller also typically receives data from a power block system as to the condition and requirements of the power generators and from a weather station regarding current and anticipated weather conditions, such as high winds, e.g., 30 mph or greater, precipitation, or other weather conditions that can affect operation of the collectors.

Typically, the master controller comprises a video display including information on the status of each collector in the field. This information includes the collector's position in the solar field, whether the collector is offline or online, whether it is working or out of service, the temperature of the heat transfer fluid or other absorber associated with each collector, whether the collector is idle (not moving), is in virtual tracking mode (being automatically operated by the sun-tracking software in its local controller), or is actually following the sensed position of the sun, or whether it is being manually operated, whether it is in the "stowed" position and locked because it is night or the sun is otherwise not shining, or because of threatening weather, in the "freeze" mode (the mode used when the heat transfer fluid is too cold to flow freely, and the collector has been moved to "stow" position). The status information also includes whether the collector is in "follow" mode (typically used when the absorber is too hot, and the motor is set to move the collector so as not to focus directly on the sun, but to focus on a point about 10 degrees behind the sun's position as it moves across the sky. The video display also indicates when each motor is active, and in what direction it is moving the collector. The display is also capable of displaying an alarm condition, which can also be accompanied by an audible alarm, when a collector is malfunctioning. For example, the local controller can detect when a motor is not responding to a motor-control signal, retry the signal one or more times, and if there is still no response, transmit an alarm to the master controller which is displayed and/or sounded at the master controller site. The master controller can then send a signal to the local controller to deactivate the collector, i.e., take it out of service. The display can also provide a summary of the number and percent of collectors that are working at a given moment, and provide the history of previous states of each collector.

The solar collector tracking system can also comprise a solar receiver comprising an absorber associated with a PV cell or a heat transfer fluid positioned so as to receive solar radiation from each solar collector; temperature-sensing means (also referred to as a temperature indicator), such as a thermocouple or other such means known to the art, operably connected to each solar collector for detecting and signaling the temperature of the absorber. Such sensing and signaling means are known to the art. The local controller then comprises means for receiving temperature status signals from the position-sensing means and means for comparing the temperature of the absorber with a desired temperature and transmitting motor-control signals to control movement of the multiple solar collectors so as to produce optimal temperatures in the absorber. Means for receiving temperature status signals and means for comparing the absorber temperature with a desired temperature and generating resultant motor movement signals are known to the art. Typically, in a tracking solar collecting thermal system, the heat transfer fluid is at a temperature between about 200° F. and about 750° F., and the desired temperature is typically greater than about 60° F. or 70° F. and up to about 750° F. or less. Those of skill in the art can readily determine optimal heat transfer fluid or PV cell operating temperatures without undue experimentation.

The master controller can also comprise means for receiving temperature status signals from the local controller for each solar receiver; and means for transmitting overriding position-control signals from the local controller for each said solar collector to the motor controller to produce an optimal temperature of the absorber. Means for sending and receiving such temperature status signals are known to the art as are means for calculating and transmitting overriding position control signals to the motor controller to produce an optimal absorber temperature.

The solar collector tracking system can also comprise a radio frequency broadcasting tower for broadcasting wireless signals to and from the master controller and the local controller.

Figure 6:
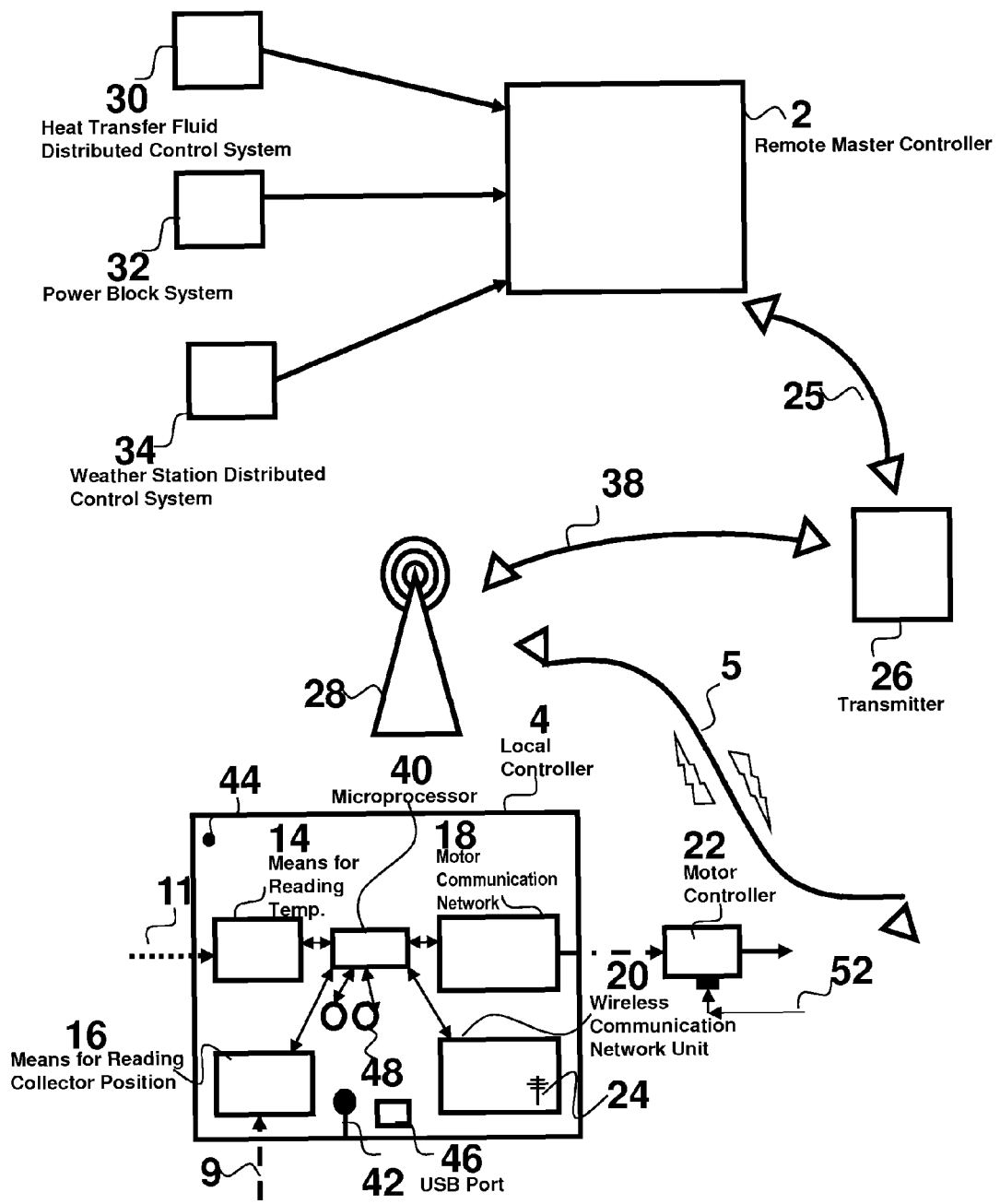
FIG. 6 is a flow diagram illustrating the flow of information and activation signals in a sun-tracking control system as described herein, including a master controller.

The local controller typically comprises a circuit board, and controls the operation of two or more solar collectors. The local controller is advantageously mounted in a weatherproof container, such as a box with a door having a waterproof seal, on a support for the collector or a pylon near a collector. In typical solar arrays utilizing parabolic trough collectors, the collectors are set out in rows with a pylon near each collector. When the local controller controls the operation of multiple solar collectors, it is typically positioned with respect to the collectors in such a way as to minimize the length of the data cables required between the collectors and the local controller. For example, each local controller can control three collectors, including the adjacent collector and the collector above and below the adjacent collector, as shown in FIG. 6. Other arrangements are also effective at minimizing data cable lengths, such as having each local controller control the collectors to either side of it, as well as a collector above or below one of the other collectors. The local controllers can also each control four, five or more collectors.

The local controller can also comprise manual controls such as push buttons or switches for controlling movement of each solar collector in a backward or forward direction. When the manual controls are operated, the local controller automatically stops sending self-generated motor-control signals. Also, it typically transmits a signal to the master controller indicating that a manual override has been performed.

In an embodiment hereof, the local controller is in wireless communication with the master controller. This typically involves a local antenna associated with each local controller, advantageously built into the local controller circuit board, for such wireless communication with the master controller. The local antenna receives data signals from a communications network unit comprised within the local controller and transmits them to the master controller. In an embodiment, the wireless signals are transmitted from the local antenna to an antenna tower and from there to the master controller, e.g., via a data wire connection to a transmitter linked via Ethernet communication to the master controller. The antenna tower is also capable of receiving signals from the master controller, e.g., via the Ethernet connection and transmitter, and broadcasting them to the entire solar field.

The local controller can also or alternatively be in wired connection with the master controller. In this case, the local controller circuit board advantageously comprises a plug-and-socket connector for connection with a wire for communication with the master controller. Previous local controller circuit boards have not used plug-and-socket connections for wired communication of a local controller circuit board with a master controller, but have simply soldered the communication wire connection to the surface of the board. Thus, in the event of a power surge or lightning strike, the wired connector can be destroyed and nearby components can also be destroyed. Using a plug-and-socket connection provides added durability to the connection. In addition, the local controller can also comprise a wireless network communication unit that is automatically activated if the connector for wired communication with the master controller fails. Alternatively, the master controller and local controller can be in wireless communication as their default mode, and if the wireless communication fails, wired communication can automatically be initiated.

The local controller can also comprise a USB port for connection to a computer processor. The computer processor, e.g., a laptop, can be taken to the field and connected to the local controller through the USB port and used to update the software in the local controller with new routines or new configuration parameters. Configuration parameters are values needed to calculate the position of the sun, such as latitude, longitude, time, date and elevation and others known to the art.

The local controller can also comprise an AC power connection with an AC/DC converter. Power is distributed via conventional conduits to the components of the local controller.

In an embodiment, referred to herein as a "variable-frequency tracking system," the microprocessor comprises software capable of providing signals to the local motor controller to start and/or stop movement of the motor and/or change motor speed and/or direction in response to status signals received by the microprocessor. The status signals include signals from the temperature and position signal readers in the local controller. The software can also be programmed with selected parameters for controlling motor movement, such as ramp-up and ramp-down times, speed of motor movement, and the like for normal sun-tracking, for initiation of sun-tracking and for normal and emergency stowing of the collector. The motor controller receives a single-phase 110 V AC input and comprises components for converting this 110 V AC power input to a three-phase 220 V AC power output. The three-phase output allows acceleration and deceleration patterns for controlling the motor to be programmed into the motor controller. In an embodiment, the motor controller is a commercially available AC variable-frequency drive, Model No. GS2-11 P0 that provides multiple settings for acceleration and deceleration ramps, available from Automation Direct of Cumming, Ga. Other commercial AC drives performing the same functions can also be used.

The three-phase motor controller output allows the motor controller to be programmed by the microprocessor to control how the motors are started and stopped and their speed, direction and other operation parameters. The motors can be started slowly over a selected period of time ("ramp-up time"), e.g., about 1 to about 5 seconds, and advantageously about 1 to about 3 seconds, or in an embodiment about 3 seconds. This period of time is selected to be short enough to so as not to interfere with accuracy of sun tracking when the collector is being moved into optimal sun-tracking position from a stow position or a previous sun-tracking position. The ramp-up time should also be long enough to minimize spiking of the electricity to the motor. When the motor is started by means of an abrupt electric pulse, as in previously-known sun-tracking systems, the current typically spikes for a short period, e.g., about 0.1 to about 0.2 seconds. For example, a 10 A current can spike up to about 20 A, high enough currents that can damage or burn out components in the motor or motor controller and, in previously known sun-tracking systems that did not have separate motor controllers, circuit boards controlling the motor could be destroyed.

The period of time over which stopping occurs (the "ramp-down period") should be short enough to preserve sun-tracking accuracy, or to respond to emergency situations, such as the need to move the reflector quickly into stow position to minimize wind and weather damage when emergency weather conditions arise. It is desirable to stop motor movement as quickly as possible, e.g., over a period of about 0.1 to about 0.5 seconds.

The local controller can also be programmed via the microprocessor to control the motor to speed up, slow down, or change directions. It can be desirable to move the collector into a selected end position as quickly as possible, for example when the motor is first moved into sun-tracking position from stow position or from a stopped position not focused on the sun, or when it is moved into stow position in response to possibly damaging adverse weather conditions. The software can program the local controller to activate starting of the motor and thereafter to operate the motor at a desired speed, such as about 10 Hz (slow speed) to about 60 Hz (fast speed). In some embodiments, maximum speed is desired, e.g., at least about 60 Hz. The motor can be activated to move into the selected end position when the position of the collector differs by a selected angular distance from the desired end position of the collector. Any appropriate angular distance can be selected. In an embodiment, this selected angular difference is about 1 degree. Thus, the local controller can be programmed upon activation in the morning when the collector is in stow position to cause the motor to start up over the selected ramp-up period and then move at maximum speed to focus on the sun, e.g., to move from a stow position of about 30 degrees below horizontal to a distance of about 10 degrees above horizontal. The ramp-down period is selected so as not to overshoot the required end position, which can be, for example, about 0.125 degrees ahead of the collector's optimal sun-tracking position. Moving the collector at fast speed can cause the collector position to coast past the desired end position, typically by about 0.3 degrees. Thus when the collector has reached a position about 1 degree short of the desired end position, the slow speed is activated until the position is typically 0.07 degrees from the desired end position where the motor stop ramp-down is begun.

During normal tracking, when the position of the sun has moved to a point a selected distance ahead of the collector, such as about 0.125 degrees ahead of the collector's optimal sun-tracking position, the motor controller is programmed to start the motor over a selected ramp-up period, selected to be short enough to preserve sun-tracking accuracy and long enough to avoid spiking, move the collector into position at a selected speed, which is selected to be short enough to preserve sun-tracking accuracy and long enough to prevent overshooting the desired end position for the collector, which can be, for example, about 0.125 degrees ahead of the optimal sun-tracking position, and stop the motor over a desired ramp-down period, e.g., about 1-3 seconds.

The microprocessor can also program the motor controller having a one-phase 110 V AC input and a three-phase 220 V AC output to move the motor in a forward direction when following the sun across the sky, and a backward direction when moving the collector into stow position.

Figure 7:
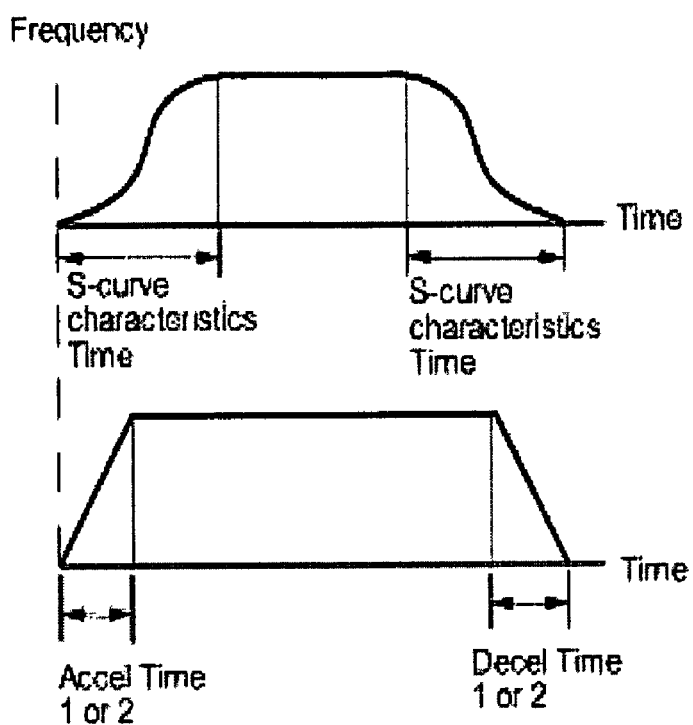
FIG. 7A shows S-curve and angled straight-line acceleration and deceleration patterns the motor controller can be programmed to implement. The time periods over which such acceleration and deceleration can occur are shown in FIG. 7B.
Figure 7:
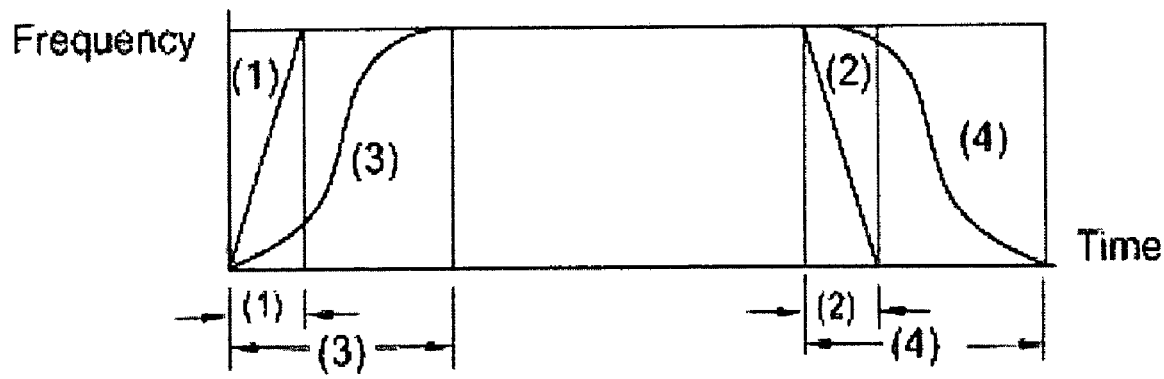

FIG. 7A shows S-curve and angled straight-line acceleration and deceleration patterns the motor controller can be programmed to implement. The time period over which each acceleration and deceleration curve or line occurs, as illustrated in FIG. 7B can be programmed by the user.

This embodiment of the variable-frequency tracking system requires only about one-half the power required by previous sun-tracking systems to move the collector into desired end positions and track the sun. The saved power can be sold to customers of the power plant to which the solar field comprising the variable-frequency tracking system supplies power. In addition, the use of this system saves wear and tear on the motor and associated components.

Also provided herein is a method of controlling the orientation of multiple solar collectors in a solar field. The method comprises activating a local controller to send data signals to multiple motor controllers, each operationally connected to a separate motor that moves each solar collector, said signals commanding the motor controllers to provide power to the motors to move the solar collectors into their optimal positions. The activated local controller can also receive data from multiple position indicators, each operably connected to a solar collector, and send it to a master controller, and can, in addition, automatically compare the position of each collector with its optimal position for reflecting solar energy from the reflector to an associated receiver, calculate the motor movement required to move each collector into an optimal position, and send the data signal based on this calculation. "Activating a local controller" means providing it with power to operate. In an embodiment hereof, an AC line is connected to the local controller, and the local controller comprises an AC/DC converter to provide DC power to run the functions of the local controller.

The method hereof can also comprise activating a master controller to receive data from the local controller. The master controller can also send an overriding signal to the local controller commanding it to send signals to the motor controllers commanding them to provide power to the motors to move the solar collectors into their optimal positions. "Activating a master controller" means placing it communication with the local controller. As discussed above, the data and overriding signals can be transmitted wirelessly or with data lines.

Also provided herein is a method for constructing or maintaining a solar collector field comprising multiple solar collectors. The method comprises installing a local controller and operably connecting it to multiple solar collectors that are to be under its control. The operable connection is made by connecting each local controller to a motor controller for each of the solar collectors under its control via a data line or wireless communication means. The motor controllers, in turn, are connected via a power line to the motors that change the position of the solar collectors. As discussed above, the local controller can be programmed in the field, or it can be programmed via signals from the master controller, by loading software on the local controller. The local controllers are advantageously placed in weather-proof containers on or near the solar collectors they control. Advantageously, a circuit breaker is also placed in the container so that in the event of a power surge, the circuit board will not be damaged, and can be reconnected when the surge has passed. The modular nature of the components of the system allow a local controller circuit board, motor or motor controller to be easily replaced in the field.

As shown in FIG. 1, previously-known solar array control systems included a remote master controller 2 and a number of local controllers 4, each of which separately controls the movement of a single solar collector 6 via its associated motor (not shown). The master controller is connected via a data line 7 to the local controllers 4. In addition, power lines 3 run between the local controllers and the motors. This makes installation and maintenance both expensive and inefficient.

Figure 2:
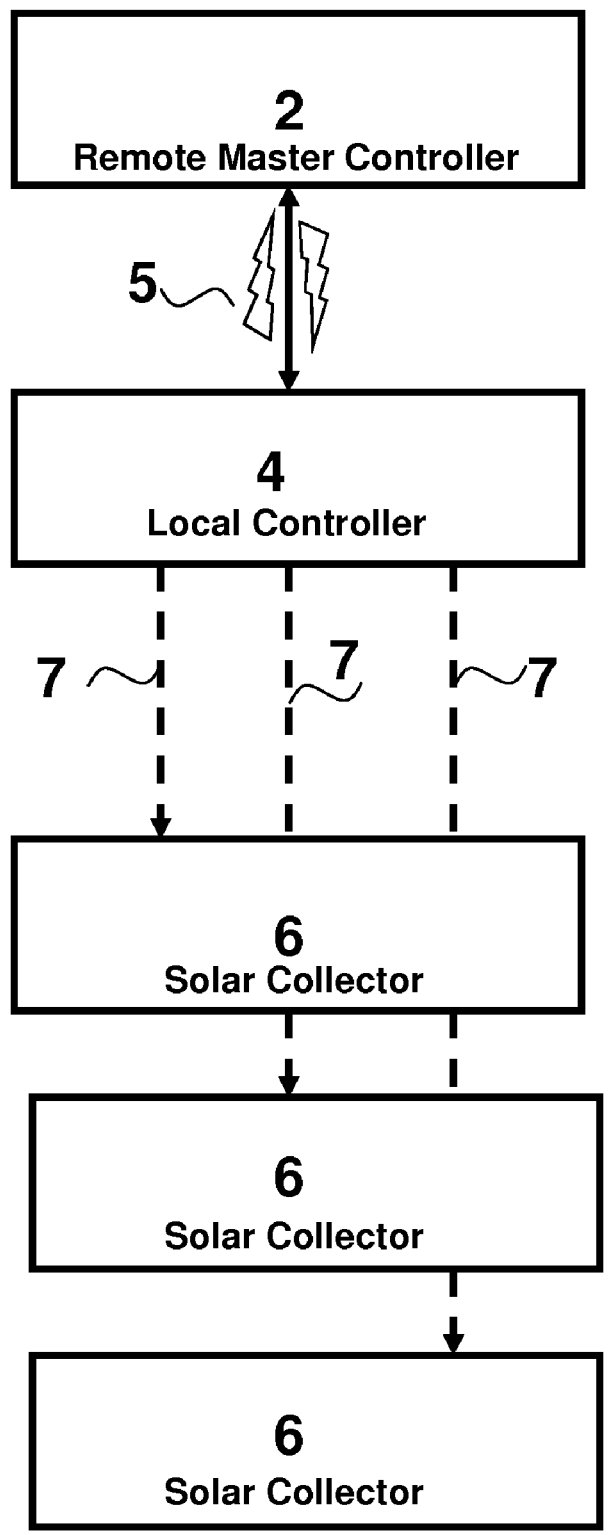
FIG. 2 is a schematic drawing showing the configuration of an embodiment of the present sun-tracking control system.

FIG. 2 is a schematic showing one embodiment hereof in which the master controller 2 is in wireless connection 5 with a local controller 4, which controls the movement of multiple solar collectors 6 via a signal from the local controller 4 carried on data lines 7. In an embodiment, the local controller 4 comprises a circuit board.

Figure 3:
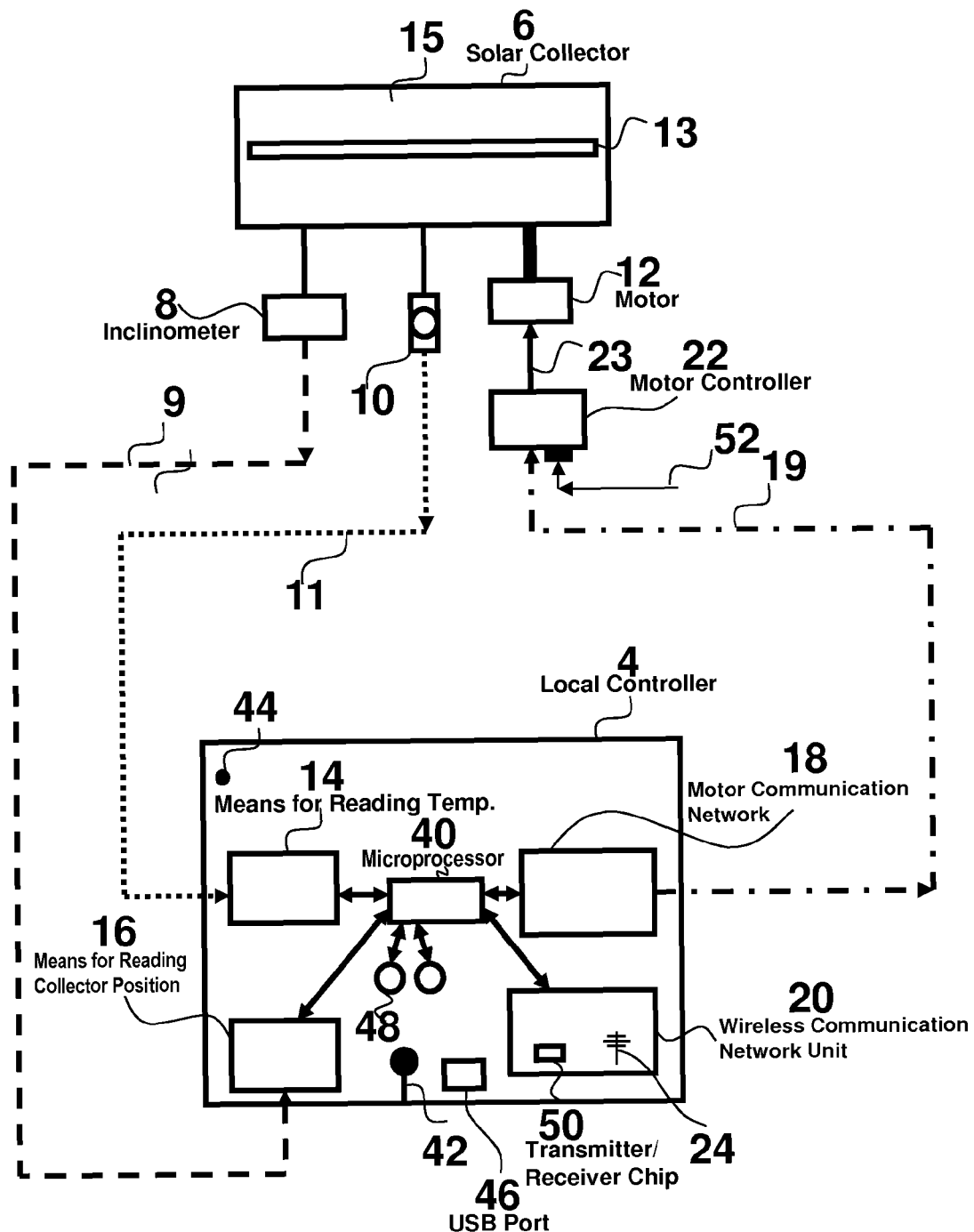
FIG. 3 is a flow diagram illustrating the flow of information and activation signals between a local controller and a single solar collector in a sun-tracking control system as described herein.

FIG. 3 is a schematic drawing showing an embodiment hereof in which a solar collector 6 (comprising a structure presenting a reflective surface on reflector 15 and a receiver 13) has an associated position-sensing means such as an inclinometer 8 for sensing the position of the collector and sending a position status signal via position status signal connection 9, to means for reading collector position 16 comprised in local controller 4. This signal can be wireless or can be transmitted through data wires such as optical cables. In addition, the solar collector has an associated temperature-sensing means such as a thermocouple 10 for sensing the temperature of a heat transfer fluid associated with the receiver, and sending a temperature status signal via temperature status signal connection 11, to means for reading temperature 14 in local controller 4. Each solar collector 6 is also equipped with a motor 12 having an associated motor controller 22 that is controlled via a serial cable 19 that carries a data signal to it from motor communication network 18 on local controller 4. Motor controller 22 controls motor 12 via a power connector 23 carrying an electric current, such as an AC current, to power the movement of the motor 12. Motor controller 22 receives input power from input 110 V AC line 52. The data signals can be wireless or can be transmitted through data wires such as optical cables. Local controller 4 also comprises a wireless communication network unit 20 comprising local antenna 24 as well as a transmitter/receiver chip 50 that sends and receives wireless signals through local antenna 24 to the master controller. Further, each local controller 4 comprises an AC/DC converter 42 connected to an incoming AC power line. Power connections from AC/DC converter 42 are not shown in the Figure, but it is understood that conventional power connections exist to all elements requiring power. The local controller 4 also comprises an on-board microprocessor 40 programmed to calculate appropriate motor movement. Microprocessor 40 is in two-way data communication with means for reading temperature 14, means for reading position 16, motor communication network 18, manual controls 48, and wireless communication network unit 20. Local controller 4 also comprises a USB port 46 by means of which it can be updated or programmed in the field with new algorithms or configuration parameters. It also comprises manual controls 48 via which an operator can move a collector forward (using one button) or backward (using the other button). Further, each local controller can comprise a wired communication connection for wired communication to and from the master controller (seen in FIG. 5).

Figure 4:
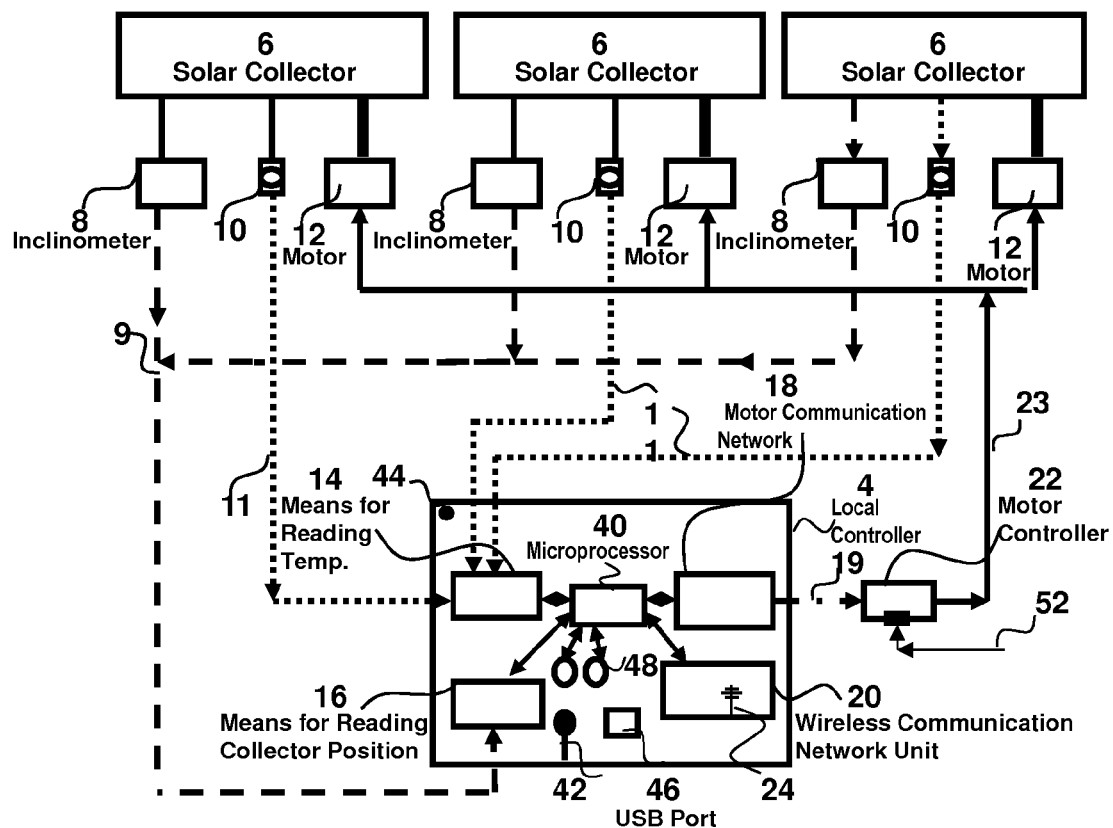
FIG. 4 is a flow diagram illustrating the flow of information and activation signals between a local controller and multiple solar collectors in a sun-tracking control system as described herein.

FIG. 4 is a schematic drawing showing the local controller 4 controlling multiple solar collectors 6. As in FIG. 3, each collector has an associated position-sensing means such as an inclinometer 8 for sensing the position of the collector and sending a position status signal via position status signal connection 9, to means for reading collector position 16 comprised in local controller 4. This signal can be wireless or can be transmitted through data wires such as optical cables. In addition, each solar collector 6 has an associated temperature-sensing means such as a thermocouple 10 for sensing the temperature of a heat transfer fluid associated with the receiver, and sending a temperature status signal via temperature status signal connection 11, to means for reading temperature 14. Microprocessor 40 is in two-way data connection with other elements of local controller 4 as described above with respect to FIG. 3. Each solar collector 6 is also equipped with a motor 12 having an associated motor controller 22 that is controlled via a serial cable 19 that carries a data signal to it from motor communication network 18 on local controller 4. Motor controller 22 receives input power from input 110 V AC line 52. Motor controller 22 controls motors 12 via a power connector 23 carrying an electric current, such as an AC current, to power the movement of the motors 12. The data signals can be wireless or can be transmitted through data wires such as optical cables. Local controller 4 also comprises a wireless communication network unit 20 comprising local antenna 24 that sends and receives wireless signals to the master controller (seen in FIG. 5). The motor controller 22 can send the same signal to each motor 12 as shown, or there can be a separate motor controller for each motor, each receiving a separate signal through a separate serial cable from motor communication network 18 for controlling each motor 12 separately. In addition, the local controller comprises an AC/DC converter 42 with appropriate power connections to other elements in local controller 4 as described above with respect to FIG. 3, and a USB port 46 as described above.

Figure 5:
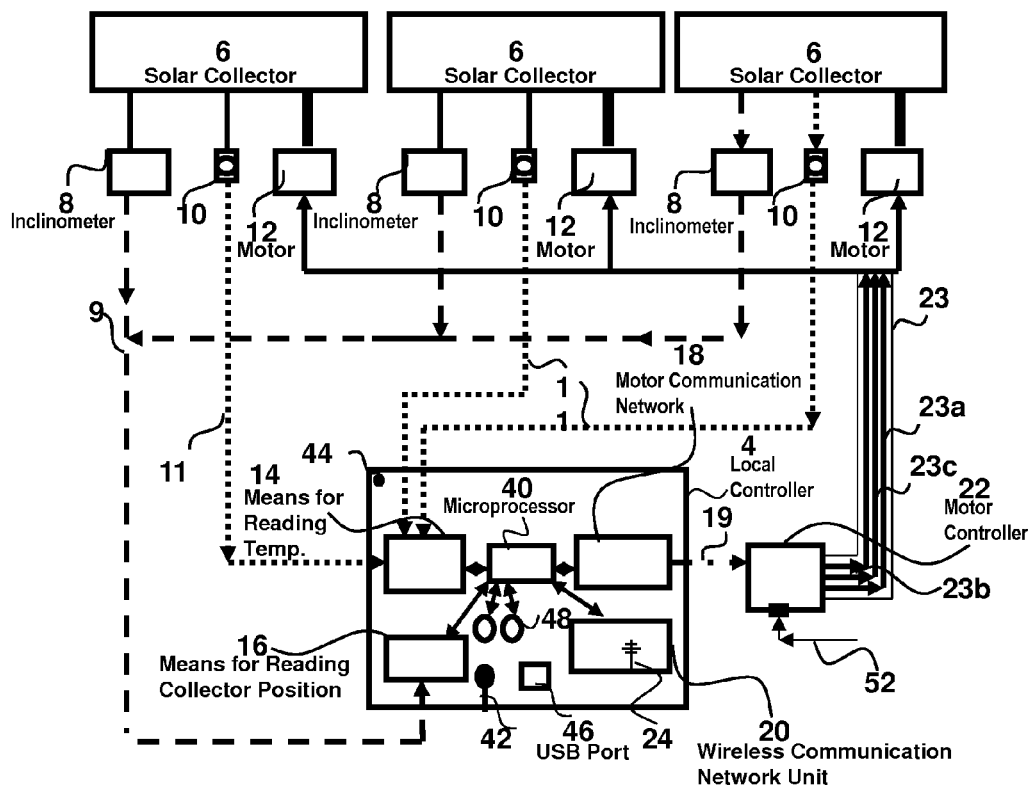
FIG. 5 is a flow diagram similar to FIG. 4 illustrating the use of a programmable variable-frequency motor controller to convert single-phase 110 AC input to three-phase 220 V AC output for controlling slow starting and stopping of the motor, as well as motor speed and direction.

In an embodiment, referred to herein as a "variable-frequency tracking system," shown in FIG. 5, the power connector 23 is a three-phase connector having three output power connections 23a, 23b and 23c. In this embodiment, microprocessor 40 is programmed with software capable of providing signals to motor controller 22 to start or stop movement of motor 12 and/or change motor speed and/or direction. The software can respond to status signals received by the microprocessor, including temperature, position and motor status signals received from the means for reading temperature 14, or means for reading collector position 16, or can be programmed with selected parameters for speed, direction, ramp-up time upon starting the motor, ramp-down time upon stopping the motor, and others parameters described herein. The reprogramming can be done in real time, i.e., while motor controller 22 is operating and collector 6 is moving. The software causes microprocessor 40 to provide data signals via data line 19 to motor controller 22 to convert the 110 V AC power entering motor controller 22 via 110 V AC input 52 to 220 V. This power is converted to a three-phase output and sent via power connectors 23a, 23b, and 23c to control motors 12.

FIG. 6 is a schematic drawing of a solar collector tracking system hereof. In this system, the tracking system is part of a large solar field that supplies heat to a steam generator for generating electrical power. The system comprises a master controller 2 which receives input from a heat transfer fluid distributed control system 30 that monitors the temperature of the heat transfer fluid in the system at various designated points. If the heat transfer temperatures received through the local controllers and directly from the temperature sensors directly transmitting data to the master controller are significantly different, the master controller displays and/or sounds an alarm to alert an operator to take action.

The master controller 2 also receives data from the power block system 32, which senses current conditions of power generation, including power requirements of the system. If power requirements go up, the master controller 2 can place additional collectors online, and if power requirements go down, the master controller can shut down controllers so as to match the heat provided by the solar collector field to the amount of energy output from the generator required. The master controller 2 further receives input from the weather station distributed control system 34. The master controller 2 monitors weather conditions via signals from the weather station distributed control system 34, so that it is able to issue overriding commands to the separate local controllers 4 to move the solar collectors into "stow" mode (typically facing the ground when high winds or damaging weather conditions exist). Whenever required, the master controller 2 can issue overriding commands to one or more local controllers 4. For example it can issue commands to move a single collector, all the collectors controlled by a single local controller, a column or row of collectors in a solar array, a contiguous section of the solar field, and so on.

The master controller 2 is in Ethernet connection 25 with a transmitter 26 that transmits data signals directly over direct data connection 38 to antenna tower 28. Antenna tower 28 is a broadcasting means that is in wireless connection 5 with local antennas 24 in the wireless communication network 20 of local controller 4. Antenna tower 28 broadcasts specific signals intended for each separate local controller 4 and for each separate collector controlled by each local controller 4 to local antennas 24. Antenna tower 28 also receives signals broadcast from local antennas 24 via wireless connection 5 providing data about the position and local conditions at each solar collector. Antenna tower 28 converts the wireless signals it receives to electronic signals and transmits them via direct data connection 38 back to transmitter 26 and from thence via Ethernet connection 25 to master controller 2.

FIG. 7A shows a graph of current frequency vs. time to produce S-curve and straight line acceleration and deceleration patterns the motor controller can be programmed to implement. The time period over which each acceleration and deceleration curve or line occurs, as illustrated in FIG. 7B can be programmed by the user. In embodiments S-curve (3) is used for start-up in all applications, i.e., morning start-up and start-up for each subsequent increment of sun-tracking movement, with a selected time over which the S-curve is applied which is between about 1 and about 3 seconds. In an embodiment, straight-line deceleration angle (1) is chosen both for stowing the collector and for stopping after each increment of sun-tracking movement, over a selected time of between about 0.5 and about 1 second.

Figure 8:
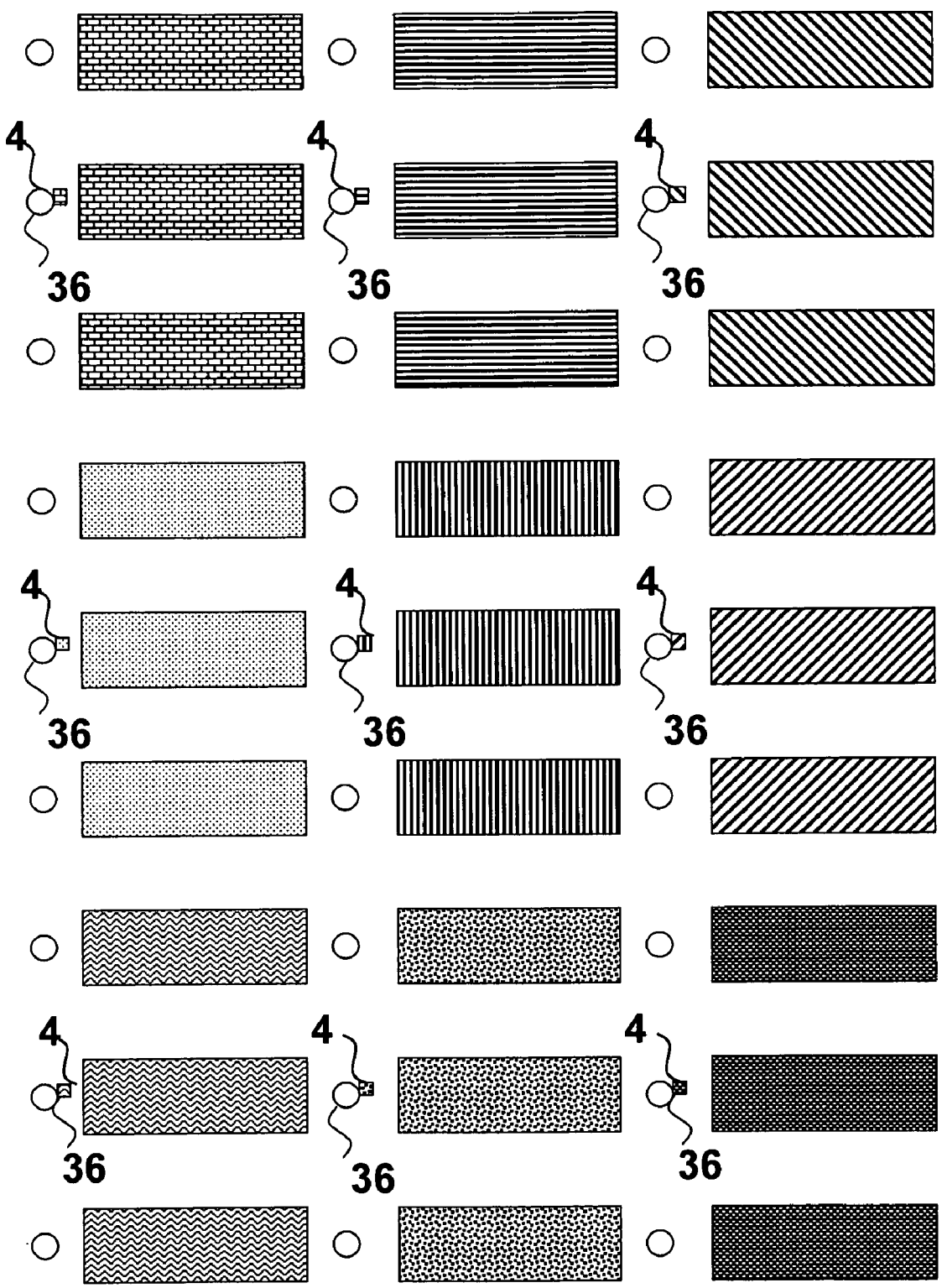
FIG. 8 is a schematic drawing of a solar collector array showing pylons adjacent each solar collector and local controllers attached to every third pylon.

FIG. 8 is a schematic drawing of a solar collector array showing pylons 36 adjacent each solar collector, with a local controller 4 attached to every third pylon. Hatched line patterns in common between collectors and local controllers indicate that the collectors are controlled by that local controller. As will be appreciated by those of skill in the art, additional configurations can also be used, for example, each local controller can control the two collectors to either side of it, and one or more collectors diagonally above or below it.

The sun-tracking system typically becomes operational in the morning when the sun rises. The local controllers automatically signal the motor controllers to move the collectors out of locked stow positions, which is typically when they are oriented 30 degrees or so below the horizon, and into their first position focused on the sun, or typically a selected distance about 0.05 to about 0.15 degrees ahead (west) of the sun, in embodiments, about 0.05 to 0.125 degrees, west of the sun, and in other embodiments about 0.05 to 0.07 degrees west of the sun's 360-degree path around the earth. When the sun-tracking algorithm in the local controller determines that the sun has reached a position the same selected distance ahead of the collector, the motor communication network unit in the local controller sends a signal to the motor controller to activate the motor to move the collector ahead until it is again that selected distance ahead of the sun. This process is repeated through the day until the sun sets and the local controller sends a command to the motor controller to activate the motor to place the collector in stowed and locked down position.

The local controllers can be commanded to take one or more of the collectors under their control out of service, or stow them or place them in any of the modes discussed above when conditions warrant. In addition, an operator in the field can upload software and configuration parameters into the local controllers, or an operator at the master controller can remotely load software or configuration parameters into the local controllers.

EXAMPLE

A sun-tracking system comprising a local controller in operational connection with three parabolic trough solar collectors is provided. The system comprises thermocouple temperature sensors capable of monitoring heat transfer fluid temperatures from 70° F. to 750° F.±5° F. The local controller provides high-speed wireless remote monitoring and control using field network communications between the local controller and a master controller via a 2.4 GHz wireless radio frequency network. In operation it typically takes only four to five seconds until an operator at the master controller is aware of an event occurring at a local controller and its associated components and collectors. The local controller includes a motor communication network unit that is connected to multiple motor controllers via an RS-485 optically-isolated wired network so that the local controller circuit board is isolated from power surges from the motor. Separating the motor controllers from the local controller allows either component to be quickly and easily replaced in the field.

Each motor is controlled via three-phase output from its motor controller. The motors are capable of being controlled by such variable-frequency output to start, stop, move at selected speeds, and reverse, for increased reliability and position control.

Field maintenance and debugging of the local controller can be done using a USB connection in the local controller circuit board. In addition, software in the local controller can be upgraded through the USB connection in the field, or from the master controller.

Voltage protection is provided by a quick disconnect 10 amp DIN rail-mounted circuit breaker for the motor electronics. The local controller utilizes 5 watts of power obtained from the on-board DC power supply that converts AC power from the incoming power line to DC, and has a tracking accuracy of 0.05 degrees. A 1 amp circuit breaker is used for the local controller.

The local controller can be manually controlled in the field for testing and maintenance. During normal operations, the entire solar field, as well as individual collectors, can be controlled and monitored at the site of the master controller, in the main power plant control room. The local controller circuit board has multiple layers for efficient power distribution and reduction of signal noise, and has multiple communication interfaces.

The local controller also comprises manual override push buttons.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A solar collector tracking system for maintaining orientation of multiple solar collectors to the sun to provide optimal focusing of solar radiation on a receiver, said tracking system comprising:
   multiple solar collectors, each comprising an associated motor operationally connected thereto for changing the position of each collector with respect to the sun;
   a local controller in operational connection with said multiple solar collectors, said local controller comprising motor communication means for transmitting motor-control signals to control movement of said multiple solar collectors to optimal positions with respect to the sun and thereafter for transmitting additional motor-control signals at selected times to move said collectors selected distances to maintain optimal positions of said collectors with respect to the sun;
   multiple motor controllers each comprising means for receiving motor-control signals from said local controller wirelessly or via data lines and transmitting corresponding electrical control currents via power lines to said associated motors for controlling operation of said associated motors; and
   a master controller in signal communication with said local controller, said master controller comprising:
      means for receiving position status signals from said solar collectors; and
      means for transmitting position control signals to said local controller for each said solar collector.

2. The solar collector tracking system of claim 1 also comprising a position indicator operably connected to each solar collector for detecting and signaling the position of said solar collector with respect to the sun.

3. The solar collector tracking system of claim 1 wherein said local controller also comprises position-receiving means for receiving position status signals from said position indicators.

4. The solar collector tracking system of claim 3 wherein said local controller also comprises means for comparing the position of each of said multiple collectors with respect to the sun with an optimal position for each said collector, and calculating the movement required for each collector to reach said optimal position for transmittal to said motor controllers.

5. The solar collector tracking system of claim 1 wherein said motor controllers comprise means for transmitting motor status signals to said local controller wirelessly and/or via data lines.

6. The solar collector tracking system of claim 1 wherein said master controller comprises means for transmitting overriding position control signals to said local controller for each said solar collector.

7. The solar collector tracking system of claim 1 also comprising:
   a solar receiver comprising an absorber positioned so as to receive solar radiation from each solar collector;
   a temperature indicator operably connected to each absorber for detecting and signaling the temperature of said absorber;
   wherein said local controller also comprises:
      means for receiving temperature status signals from said temperature indicator;
      means for comparing the temperature of said absorber with a desired temperature and transmitting motor-control signals to control movement of said multiple solar collectors so as to produce an optimal temperature of said absorber.

8. The solar collector tracking system of claim 7 wherein said absorber is a heat transfer fluid or a photovoltaic cell.

9. The solar collector tracking system of claim 1 wherein said master controller also comprises:
   means for receiving temperature status signals from said local controller for each said solar collector; and
   means for transmitting overriding position control signals from said local controller for each said solar collector to produce an optimal temperature of said absorber.

10. The solar collector tracking system of claim 1 also comprising: a radio frequency broadcasting tower for broadcasting wireless signals to and from said master controller and local controller.

11. The solar collector tracking system of claim 1 wherein said local controller is in the form of a circuit board comprising at least one component selected from the group consisting of a microprocessor, input-output circuitry, a wireless communication network unit, an AC/DC power converter, and an AC power connector to provide power to said local controller.

12. The solar collector tracking system of claim 11 wherein said circuit board comprises a microprocessor, which comprises software capable of providing signals to the motor controller to start and/or stop movement of the motor and/or change motor speed, in response to status signals received by the microprocessor.

13. The solar collector tracking system of claim 1 wherein a single-phase 110 V AC power input entering said motor controller is converted in said motor controller to a three-phase output.

14. The solar collector tracking system of claim 1 wherein the local controller comprises wireless communication means and is in wireless communication with said master controller.

15. The solar collector tracking system of claim 1 wherein the local controller comprises manual controls for controlling movement of each solar collector.

16. The solar collector tracking system of claim 1 wherein said local controller controls the operation of three or more solar collectors.

17. A method of controlling the orientation of multiple solar collectors in a solar field, said method comprising:
   activating a local controller to send data signals to multiple motor controllers, each operationally connected to a separate motor that moves each solar collector, said data signals commanding said motor controllers to provide power to said motors to move said solar collectors into their optimal positions; and
   activating a master controller to receive data from said local controller.

18. A method for constructing or maintaining a solar collector field comprising multiple solar collectors, said method comprising:
    installing a local controller in said solar collector field;
    operably connecting said local controller to multiple motor controllers;
    operably connecting each said motor controllers to a motor for changing the position of a solar collector; and
    programming said local controller via signals from a master controller.

* * * * *